(12) United States Patent
Frydrych et al.

(10) Patent No.: US 12,093,369 B2
(45) Date of Patent: Sep. 17, 2024

(54) SYSTEMS AND METHODS FOR DETERMINING EXECUTION STATE

(71) Applicant: Irdeto B.V., Hoofddorp (NL)

(72) Inventors: Tomasz Frydrych, Hoofddorp (NL); Michail Greshishchev, Hoofddorp (NL); Jakub Janowski, Hoofddorp (NL); Peter Meerwald-Stadler, Hoofddorp (NL); Duncan Ogilvie, Hoofddorp (NL); Piotr Skrzypczak, Hoofddorp (NL); Markus Spitzlinger, Hoofddorp (NL); Grzegorz Terlikowski, Hoofddorp (NL)

( * ) Notice: Subject to any disclaimer, the term of this patent is extended or adjusted under 35 U.S.C. 154(b) by 67 days.

(21) Appl. No.: 17/705,727

(22) Filed: Mar. 28, 2022

(65) Prior Publication Data
US 2022/0318373 A1    Oct. 6, 2022

(30) Foreign Application Priority Data

Mar. 31, 2021    (EP) ..................................... 21461529

(51) Int. Cl.
*G06F 21/52* (2013.01)
*G06F 11/36* (2006.01)

(52) U.S. Cl.
CPC .............. *G06F 21/52* (2013.01); *G06F 11/36* (2013.01); *G06F 2221/033* (2013.01)

(58) Field of Classification Search
CPC ..... G06F 21/52; G06F 11/36; G06F 2221/033
See application file for complete search history.

(56) References Cited

U.S. PATENT DOCUMENTS 7,954,094 B2 *   5/2011   Cascaval ............. G06F 9/45516
                                                717/145
9,158,604 B1    10/2015   Christodorescu et al.
(Continued)

OTHER PUBLICATIONS

Huang et al., "DtCraft: A High-Performance Distributed Execution Engine at Scale", 2019, IEEE, vol. 38, No. 6 (Year: 2019).*
(Continued)

*Primary Examiner* — Qing Chen
*Assistant Examiner* — Junchun Wu
(74) *Attorney, Agent, or Firm* — Rimon PC; Marc S. Kaufman

(57) ABSTRACT

There is described a method of enabling identification of the execution state of an item of software at runtime. The method comprises receiving from one or more clients one or more respective labelled sets of invocation data generated at the one or more clients by the execution of an executable of the item of software configured to cause the collection of invocation data at runtime for one or more callable units of the item of software, wherein each labelled set of invocation data comprises a label indicating an execution state of the item of software during a respective portion of runtime and invocation data corresponding to said respective portion of runtime; training, based on said collection of invocation data, an identification algorithm to identify the execution state of the item of software from collected invocation data of the item of software. There is also described a related method of identifying the execution state of an executable during a portion of runtime, as well as related apparatus and computer programs.

16 Claims, 7 Drawing Sheets

(56) References Cited

U.S. PATENT DOCUMENTS

| | | | | |
|---|---|---|---|---|
| 9,935,959 | B2* | 4/2018 | Keith | H04L 63/10 |
| 10,558,809 | B1* | 2/2020 | Joyce | G06N 5/046 |
| 11,748,178 | B2* | 9/2023 | Bachmutsky | G06F 8/44 |
| | | | | 719/312 |
| 11,922,220 | B2* | 3/2024 | Haghighat | G06F 11/3409 |
| 2015/0293831 | A1* | 10/2015 | Li | G06F 11/36 |
| | | | | 717/124 |
| 2019/0121979 | A1* | 4/2019 | Chari | G06F 8/433 |
| 2019/0305957 | A1* | 10/2019 | Reddy | G06F 8/60 |
| 2019/0340103 | A1* | 11/2019 | Nelson | G06F 11/3624 |
| 2021/0034489 | A1* | 2/2021 | Klapper | G06F 21/55 |
| 2021/0124825 | A1* | 4/2021 | Dabak | G06F 21/606 |
| 2021/0133324 | A1* | 5/2021 | Chari | G06F 21/566 |
| 2021/0182387 | A1* | 6/2021 | Zhu | G06F 21/52 |
| 2022/0129540 | A1* | 4/2022 | Sheriff | G06N 20/00 |
| 2022/0207140 | A1* | 6/2022 | Mooney, III | G06F 21/563 |
| 2023/0091293 | A1* | 3/2023 | Duplys | G06F 21/577 |
| | | | | 726/25 |

OTHER PUBLICATIONS

Zhang et al., "A Platform for Secure Static Binary Instrumentation", 2014, ACM (Year: 2014).*

Hunt et al., "Chiron: Privacy-preserving Machine Learning as a Service", Mar. 2018, arXiv (Year: 2018).*

Coro et al., "Parallelizing the execution of native data mining algorithms for computational biology", 2014, John Wiley & Sons, Ltd. (Year: 2014).*

Kong et al., "Runtime Monitoring of Software Execution Trace: Method and Tools", 2020, IEEE Access (Year: 2020).*

Bocchino et al., "Safe Nondeterminism in a Deterministic-by-Default Parallel Language", 2011, ACM (Year: 2011).*

EP21461529.6, Extended European Search Report dated Aug. 27, 2021, 8 pages.

* cited by examiner

SYSTEMS AND METHODS FOR DETERMINING EXECUTION STATE

FIELD OF THE INVENTION

The present invention relates to systems and methods for identifying executions states of existing software applications. In particular, targeted used of software protection of such applications may be enabled by such identification.

BACKGROUND OF THE INVENTION

Software applications are often subject to attack by operators seeking to bypass restrictions, enable unauthorized functionality, exfiltrate sensitive data (such as cryptographic keys or secured content). This is often aided by the fact that software applications may typically execute on a system under the control of the operator allowing complex, low-level attacks to be carried out either directly by the operator or via the use of specially crafted additional malicious applications running on the system.

The problems caused by such attacks can cause wider consequences, especially for software applications that serve as clients in a larger online system. For example, attacks on content delivery software applications can case the unauthorized distribution of content assets. Attacks on financial services clients may cause fraudulent transactions to be propagated onwards. Attacks to online game clients, such as to enable unauthorized functionality or to manipulate game state, may cause service degradation for other users, or even crash central game servers causing loss of service for many other users.

In view of this numerous software protection and verification methods have been developed over the years, notably white-box type approaches where the attacker of software application is assumed to have full access to, and visibility of, the data being operated on (including intermediate values), memory contents and execution (or process or control) flow of the software application. Many protection approaches (such as those described in WO 2018/108275 A1) have the benefit of being able to be applied to existing software, without the need for the software itself to be re-coded. Some approaches involve additional helper applications, executing at an operating system level, to monitor for potentially malicious activity (such as manipulation of memory allocated to the software application, simulated input being presented to the software application etc.) and if detected take action to thwart the potential attack. Some further approaches involve continuous external monitoring (or remote attestation) of the execution of the software application, typically by a remote server to ensure that the control flow is not being tampered with.

However, such techniques can incur additional processing overheads or requirements, and are typically applied on an application basis often being enabled for the duration of the execution of the application. This can be of particular concern where the protection methods involve monitoring at an operating system level and/or where software applications encompass numerous different pieces of functionality and operating states where only a sub-set are required to be secured. A tension is therefore present where the overheads of strong software protection methods are incurred across the whole software application just to secure a small part of the runtime, or instead a weaker security measure (with lower overheads) is used. This can also be of concern where multiple different protection methods are required to effectively secure different pieces of functionality but the overheads of having all such protection methods on all the time is too great to be tolerated.

SUMMARY OF THE INVENTION

It is therefore an object of the invention to enable identification of current execution states of an existing software application at runtime. Based on such identification software protection techniques that have been applied to the software application may be toggled or controlled according to the current execution state. In this way the software application may be secured in a more efficient manner.

According to a first aspect of the invention there is provided a method of enabling identification of the execution state of an item of software at runtime. An executable (such as a binary executable) of the item of software is available to be executed on one or more client systems which is enabled to collect invocation data (or invocation statistics) at runtime for one or more callable units of the item of software. The method may comprise generating the executable of the item of software to enable said generated executable to collect invocation data (or invocation statistics) at runtime for one or more callable units of the item of software; and/or distributing the generated executable to one or more clients (or client computer systems). The method comprises receiving from each client one or more respective labelled sets of invocation data, wherein each labelled set of invocation data comprises a label indicating an execution state of the item of software during a respective portion of runtime and invocation data corresponding to said respective portion of runtime; training (or otherwise configuring or arranging), based on said collection of invocation data, an identification algorithm (or identification processor or identification module or other such identification compute unit) to identify the execution state of the item of software from collected invocation data of the item of software.

In some embodiments of the first aspect said executable is enabled to collect invocation data at runtime for a plurality of callable units and said step of training comprises identifying a sub-set of the plurality of callable units for determining the execution state, and the identification algorithm is trained to identify the execution state of the item of software from collected invocation data of the sub-set of the plurality of callable units. A callable unit may be included in the sub-set based at least in part on a measure of correlation between a feature vector based on the invocation data for the callable unit and an execution state vector based on the execution state labels associated with the invocation data for the callable unit. Additionally, or alternatively, a callable unit may be included in the sub-set based at least in part on the frequency of invocation of the callable unit. The invocation data may comprise one or more of: a respective invocation count for each callable unit; a respective call stack for the invocation of each callable unit; a respective execution time of each callable unit; a respective time of invocation for each callable unit.

In some embodiments of the first aspect the method further comprises generating a further executable (such as a further binary executable), wherein said further executable is arranged to collect invocation data at runtime for the sub-set of the plurality of callable units. Generating a further executable may comprise modifying an existing executable (such as a binary executable) to collect invocation data at runtime for the sub-set of the plurality of callable units.

In some embodiments of the first aspect the step of generating executable comprises modifying an existing executable of the item of software to collect the invocation data.

In some embodiments of the first aspect the step of training comprises applying a supervised machine learning algorithm to the labeled invocation data.

In some embodiments of the first aspect, each callable unit is a respective one of: a routine; a subroutine; a function; a procedure; a method; an object method; a class method; an interface; a component; or a subsystem of a larger system. Additionally, or alternatively, one or more of the callable units may be a machine instruction or command.

According to a second aspect of the invention, there is provided a method of identifying the execution state of an executable during a portion of runtime, the method comprising: receiving, during runtime of the executable, invocation data for a set of callable units of the executable; identifying the current execution state of said executable by applying a trained identification algorithm (such as a trained or configured identification algorithm according to the first aspect) to the received invocation data. The invocation data may comprise one or more of: a respective invocation count for each callable unit; a respective call stack for the invocation of each callable unit; a respective execution time of each callable unit; a respective time of invocation for each callable unit.

In some embodiments of the second aspect a software protection mechanism may be triggered or disabled in the instance of the executable in dependence on the identified current execution state.

In some embodiments of the second aspect, each callable unit is a respective one of: a routine; a subroutine; a function; a procedure; a class method; an interface; a component; or a subsystem of a larger system. Additionally, or alternatively, one or more of the callable units may be a machine instruction or command.

According to a third aspect of the invention, there is provided a computer program which, when executed by one or more processors, causes the one or more processors to carry out a method according to the above-mentioned first or second aspect or an embodiment thereof. The computer program may be stored on a computer readable medium.

According to a fourth aspect of the invention, there is provided a system for enabling identification of the execution state of an item of software at runtime. An executable (such as a binary executable) of the item of software is available to be executed on one or more client systems which is enabled to collect invocation data (or invocation statistics) at runtime for one or more callable units of the item of software. The system comprises one or more processors which may be arranged to: generate the executable of the item of software to enable said generated executable to collect invocation data (or invocation statistics) at runtime for one or more callable units of the item of software; and/or distribute the generated executable to one or more clients (or client computer systems). The one or more processors are arranged to: receive from each client one or more respective labelled sets of invocation data, wherein each labelled set of invocation data comprises a label indicating an execution state of the item of software during a respective portion of runtime and invocation data corresponding to said respective portion of runtime; train (or otherwise configure or arrange), based on said collection of invocation data, an identification algorithm (or identification processor or identification module or other such identification compute unit or identification system) to identify the execution state of the item of software from collected invocation data of the item of software.

In some embodiments of the fourth aspect said executable is enabled to collect invocation data at runtime for a plurality of callable units and said step of training comprises identifying a sub-set of the plurality of callable units for determining the execution state, and the identification algorithm is trained to identify the execution state of the item of software from collected invocation data of the sub-set of the plurality of callable units. A callable unit may be included in the sub-set based at least in part on a measure of correlation between a feature vector based on the invocation data for the callable unit and an execution state vector based on the execution state labels associated with the invocation data for the callable unit. Additionally, or alternatively, a callable unit may be included in the sub-set based at least in part on the frequency of invocation of the callable unit. The invocation data may comprise one or more of: a respective invocation count for each callable unit; a respective call stack for the invocation of each callable unit; a respective execution time of each callable unit; a respective time of invocation for each callable unit.

In some embodiments of the fourth aspect the system is further arranged to generate a further executable (such as a further binary executable), wherein said further executable is arranged to collect invocation data at runtime for the sub-set of the plurality of callable units. Generating a further executable may comprise modifying an existing executable (such as a binary executable) to collect invocation data at runtime for the sub-set of the plurality of callable units.

In some embodiments of the fourth aspect the step of generating executable comprises modifying an existing executable of the item of software to collect the invocation data.

In some embodiments of the fourth aspect the step of training comprises applying a supervised machine learning algorithm to the labeled invocation data.

In some embodiments of the fourth aspect, each callable unit is a respective one of: a routine; a subroutine; a function; a procedure; a class method; an interface; a component; or a subsystem of a larger system. Additionally, or alternatively, one or more of the callable units may be a machine instruction or command.

According to a fifth aspect of the invention, there is provided a system for identifying of the execution state of an executable of an item of software at runtime, the system comprises one or more processors arranged to: receive during runtime of the executable, invocation data for a set of callable units of the executable; identify the current execution state of said executable by applying a trained identification algorithm (such as a trained or configured identification algorithm according to the first aspect) to the received invocation data. The invocation data may comprise one or more of: a respective invocation count for each callable unit; a respective call stack for the invocation of each callable unit; a respective execution time of each callable unit; a respective time of invocation for each callable unit.

In some embodiments of the fifth aspect a software protection mechanism may be triggered or disabled in the instance of the executable in dependence on the identified current execution state.

In some embodiments of the fifth aspect, each callable unit is a respective one of: a routine; a subroutine; a function; a procedure; a class method; an interface; a component; or a subsystem of a larger system. Additionally, or alternatively, one or more of the callable units may be a machine instruction or command.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
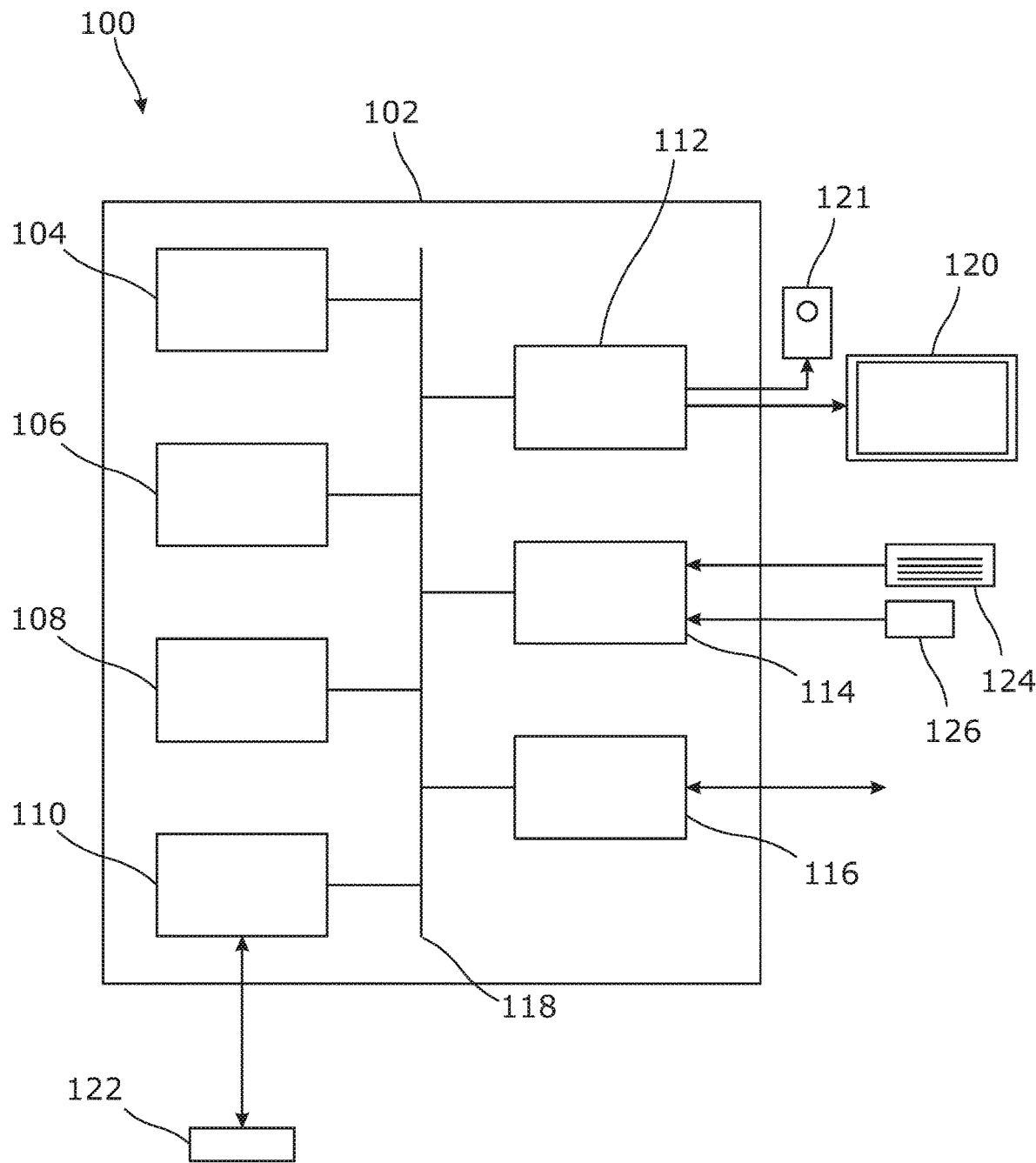
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, an optical disc, a solid-state-storage device, a ROM, etc. The storage medium 104 may store an operating system for the processor 108 to execute in order for the computer 102 to function. The storage medium 104 may also store one or more computer programs (or software).

The memory 106 may be any random access memory (storage unit or volatile storage medium) suitable for storing data and/or computer programs (or software).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2A:
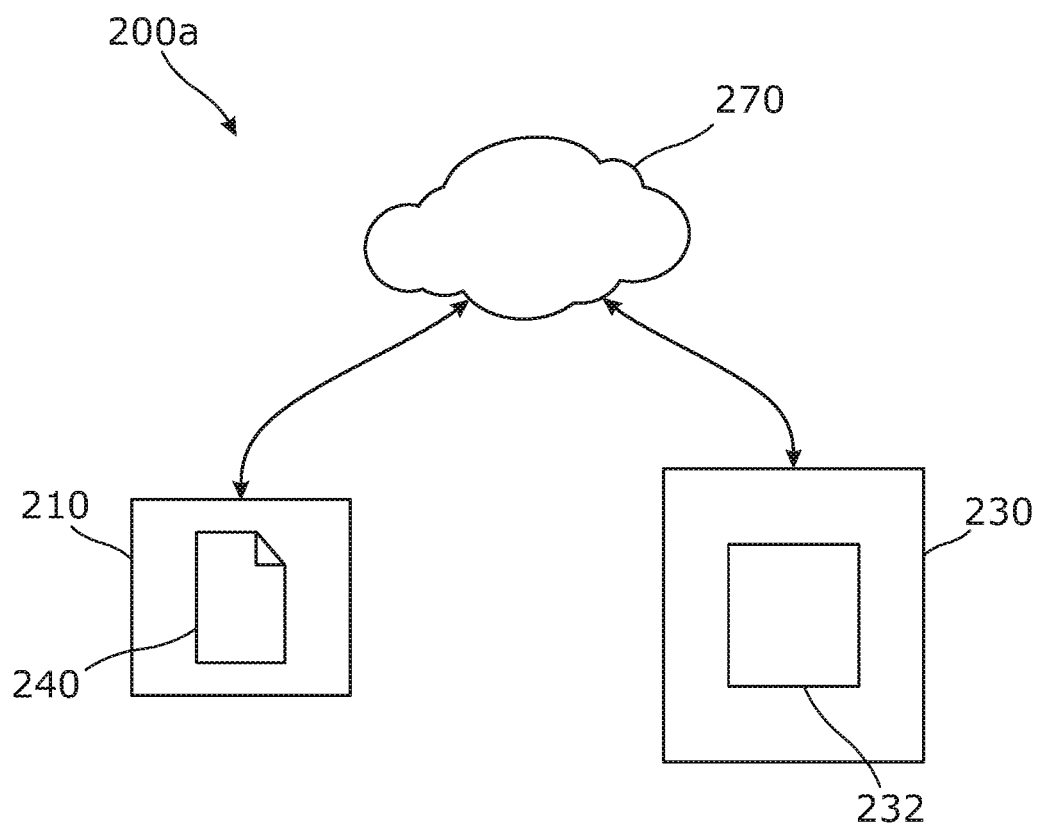
FIGS. 2a and 2b schematically illustrate example systems for applying software protections relevant to the invention.

FIG. 2a schematically illustrates an example system 200a according to some embodiments of the invention. The system 200a comprises a computer system (or client system or user system) 210, a verification system 230 and a network 270.

In summary, the computer system 210 is arranged to execute or process an item of software 240. The item of software 240 is a protected item of software—the nature of the "protection" that has been applied to the item of software 240 (or which the item of software 240 incorporates or uses) shall be described in more detail later. The verification system 230 is used, during execution of the protected item of software 240, to check or verify the integrity of the protected item of software 240 (or at least to check or verify the integrity of some or all of the protected item of software 240)—the nature of such integrity verification shall be described in more detail later. As shall become apparent, the system 200*a* enables the execution of the item of software 240 on a computer system 210, such that the integrity of some or all of the protected item of software 240 during execution, may be checked by the verification system 230.

The computer system 210 and the verification system 230 may be arranged to communicate with each other over, or via, the network 270. The network 270 may be any kind of network suitable for transmitting or communicating data between the computer system 210 and the verification system 230. For example, the network 270 could comprise one or more of: a local area network, a wide area network, a metropolitan area network, the internet, a wireless communications network, a cable network, a digital broadcast network, a satellite communication network, a telephone network, etc. The computer system 210 and the verification system 230 may communicate over the network 270 via any suitable communication mechanism/protocol in order to communicate data with each other. However, it will be appreciated that other communication scenarios are possible.

Whilst FIG. 2*a* illustrates a single computer system 210 and a single verification system 230, it will be appreciated that there may be multiple computer systems 210 and/or multiple verification systems 230 and that FIG. 2*a* has been simplified for ease of illustration.

The computer system 210 and the verification system 230 may each be, or may each comprise, one or more computer systems 100 as described above with reference to FIG. 1. For example, the computer system 210 may be a personal computer, a server computer, a laptop, a mobile telephone, a tablet computer, a television, etc. Similarly, the verification system 230 may, for example, comprise one or more server computers.

An operator of the computer system 210 may be an attacker, in that the operator may wish to launch an attack against (or based on or using) an item of software executed on the computer system 210. For example: (a) the item of software may contain, or generate, secret information that the attacker wishes to obtain (such as one or more cryptographic keys, one or more secret keys, data of other users, etc.) via the attack; (b) the attacker may try to use the item of software (in a manner not initially intended or authorized by the creator of the item of software) to achieve functionality to which the attacker is not entitled or authorized, such as by circumventing or thwarting checks; (c) the attacker may wish to achieve new/alternative functionality not originally intended with the item of software; (d) the attacker may wish to use the item of software to try to gain unauthorized access to functionality or data from one or more servers (e.g. a server hosting a website associated with a webpage providing or comprising the item of software); etc.

Some items of software may be used in a distributed (or collaborative or multi-user) configuration. In particular, the same software may be executing on a plurality of computer systems 210, each under the control of a respective user (or operator). Each computer system of the plurality of computer systems may be interacting with a common central server as part of the execution of the item of software. Examples of such configurations can include: (a) distributed work systems where a processing task (such as determining the folding states of a protein, rendering an image, etc.) is partitioned into separate processing tasks assigned to separate computer systems 210; (b) multi-player (or online) games where a plurality of users participate in a game via respective computer systems 210 running an item of software (such as a game client) managed (or mediated) by a common server; (c) enforcement of software licensing, such as where only a pre-set number of concurrent instances of a software application are authorized to run on a distributed system at one time; etc.

A so-called "white-box" attack environment is an attack model for the execution of an item of software, in which the model identifies that an attacker has various capabilities as described in more detail below (i.e. the attacker can carry out certain actions/operations and has access to certain data). Therefore, if an attacker would have those capabilities when the item of software is actually being executed in a particular execution environment (e.g. using a particular computer/processor etc.) then one may say that the item of software is executing in a "white-box" environment. In the white-box attack environment, the attacker of the item of software is assumed to have full access to, and visibility of, the data being operated on (including intermediate values), memory contents and execution/process/control flow of the item of software. Moreover, in the white-box attack environment, the attacker is assumed to be able to modify the data being operated on, the memory contents and the execution/process/control flow of the item of software, for example by using a debugger—in this way, the attacker can experiment on, and try to manipulate the operation of, the item of software, with the aim of circumventing initially intended functionality and/or identifying secret information and/or for other purposes.

However, the item of software may need to use or store or generate secret information (e.g. one or more cryptographic keys or identifiers), where this information needs to remain hidden from, or unusable/inaccessible by, the attacker (except as part of the correct/intended functionality of the item of software); the item of software may need to execute different portions of code based on particular decision logic, where it is important to ensure that an attacker cannot force the software to execute one portion of code instead of another portion of code in contradiction to the decision logic; etc. The set-up, configuration and capabilities of the computer system 210 are not necessarily known (or fully known) to, and/or are not controllable (or fully controllable) by, the provider of the item of software, and so it can be assumed that the item of software may end up being executed in a white-box attack environment. The protection techniques applied in order to generate the protected item of software 240 aim to make it difficult for an attacker to carry out a successful attack on the protected item of software 240, and/or aim to reduce/mitigate the consequences of such an attack by an attacker—i.e. the protection techniques aim to secure item of software against the white-box attack environment.

The verification system 230 comprises, or is arranged to execute, an integrity checking application 232. Thus, the verification system 230 may be viewed as an integrity checking system 230. In summary, during execution or runtime of the protected item of software 240, the protected item of software 240 may generate and provide (or communicate or transmit) verification data (or an integrity value/data, or a verification result) to the integrity checking application 232 via the network 270. The integrity checking application 232 receives the verification data and performs integrity verification functionality based on the received verification data (as shall be described in more detail later). The integrity verification functionality may be viewed as "checking the 'correctness' of the verification data".

Additionally, or alternatively, the verification data may relate to the environment in which the protected item of software 240 is being executed. The verification data may include any one or more of: (a) information identifying other software applications executing on the computer system 210; (b) memory content of the protected item of software 240 being executed; (c) information identifying the operating system; (d) handle monitoring data (for example other software applications opening a handle to interact with the protected item of software 240 being executed); (e) current operating system mode (such as in debug mode etc.); (f) the presence and/or absence of certain hardware devices (such as debugging hardware, capturing hardware, etc.)

Figure 2B:
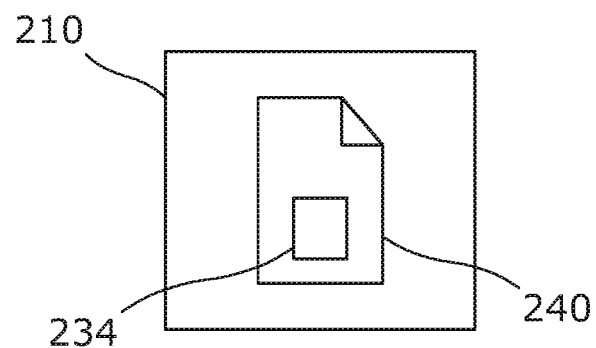

FIG. 2b schematically illustrates a further example system 200b according to some embodiments of the invention. The system 200b of FIG. 2b is the same as the system 200a of FIG. 2a, except that the system 200b does not make use of the verification system 230 and its integrity checking application 232. Instead, in the system 200b, the protected item of software 240 comprises an integrity checking module (or component) 234. In summary, during execution or runtime of the protected item of software 240, the protected item of software 240 generates verification data (or an integrity value/data, or a verification result) which the integrity checking module 234 uses to perform integrity verification functionality (as shall be described in more detail later). Again, this integrity verification functionality may be viewed as "checking the 'correctness' of the verification data".

Thus, in the system 200b, the integrity checking is carried out locally at the computer system 210, whereas in the system 200a, the integrity checking is carried out remote from the computer system 210. The system 200b provides more independence to the protected item of software 240 than in the system 200a (for example, in the system 200b, the protected item of software 240 does not require connection to the network 270 in order to communicate with the verification system 230). However, the system 200a may be viewed as more secure than the system 200b, since an attacker operating the computer system 210 would not have access to the remote verification system 230.

The protected item of software 240 may comprise one or more computer programs (or software or modules). The initial item of software 250 and the protected item of software 240 may each be, or implement, one or more entire software applications, or one or more components for a software application (e.g. a library file), or a smaller component (e.g. a code snippet). The protected item of software 240 may comprise compiled code for execution as (part of) a native application at the computer system 210. The protected item of software 240 may comprise code for execution within a virtual machine executing on the computer system 210.

The term "code" as used herein in relation to an item of software refers to instructions/commands of the item of software. In addition to code, the item of software 240 may comprise data and/or other resources, so that execution of the "code" (or execution of the item of software) comprises executing some or all of these instructions/commands, where this execution might potentially involve using some of the data and/or other resources if present in the item of software. The term "software element" as used herein in relation to an item of software refers to code and/or other components (e.g. data and/or other resources/assets) of the item of software. Thus, a software element of (or for) an item of software may comprises (a) one or more pieces of code (e.g. one or more instructions/commands) of (or for) the item of software, and/or (b) one or more pieces of data or other resources of (or for) the item of software.

It will be appreciated that an item of software 240 may comprise one or more callable units. A callable unit may be thought of as particular type (or subset of) of a software elements described above. A callable unit typically comprises one or more pieces of code (e.g. one or more instructions/commands) of (or for) the item of software 240. In some examples a callable unit may be a single executable instruction or command. A callable unit is typically arranged to be callable (or invocable or otherwise may be caused to be executed) by other code in the item of software 240. In other words, a callable unit may be or comprise one or more software routines. It will be understood that there are many types of routines known in the art including (but not limited to) subroutines, functions, procedures, methods, subprograms and so on. A software routine is usually arranged to, when executed, perform one or more tasks (or provide one or more elements of functionality). It will also be appreciated that a callable unit may comprise (or define or otherwise cause to be instantiated) one or more further callable units.

Figure 3B:
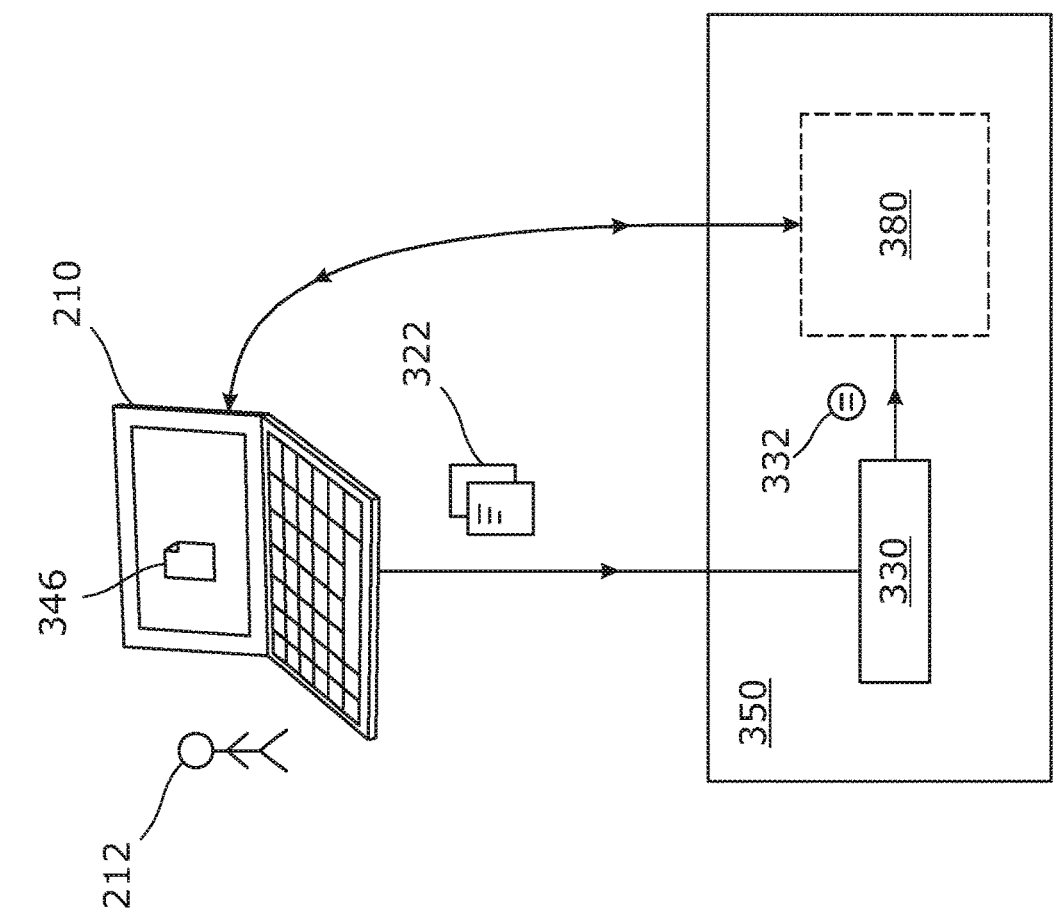
FIGS. 3a and 3b schematically illustrate a training system and an identification system respectively for identifying the execution (or runtime) state (or mode) of an item of software at runtime.
Figure 3A:
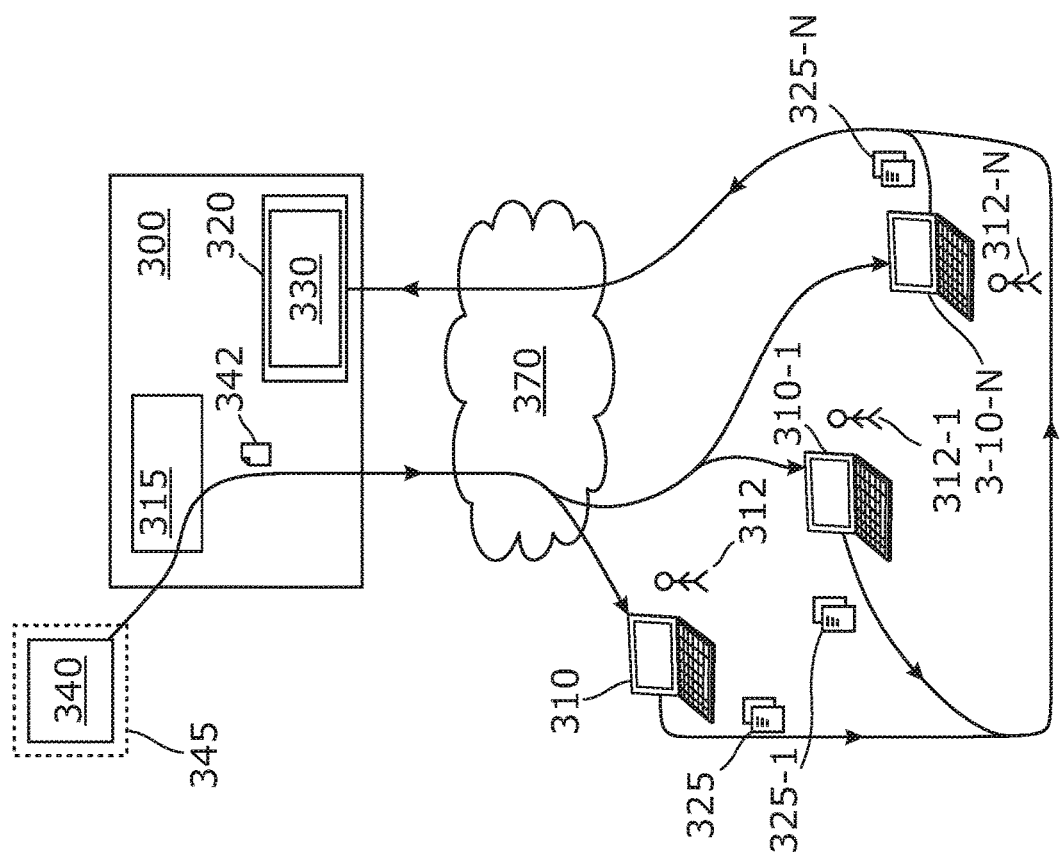

FIGS. 3a and 3b schematically illustrate a training system 300 and an identification system 350 respectively for identifying the execution (or runtime) state (or mode) of an item of software 340 at runtime. The item of software 340 may be a protected item of software 240 as describe above in reference to FIGS. 2a and 2b. As shown in FIG. 3 the systems 300; 350 comprise a state identification module 310. The state identification module 310 comprises (or is configured to execute or otherwise apply) a state identification algorithm 330.

As described below the training system 300 may be used to train (or otherwise configure) the state identification algorithm 330 to identify execution states for a particular item of software 340. The trained (or configured) identification algorithm 330 may be used as part of a system 350 to identify the execution state of an item of software 340 being run (or executed) on a computer system described shortly below in relation to the identification system 350.

The training system 300 comprises a provisioning module 315 and a training module 320. FIG. 3a also shows a network 370 and a plurality of computer systems 310; 310-1; . . . ; 310-N. For ease of discussion only a single computer system 310 will be discussed below, however it will be appreciated that these discussion apply equally to the other computer systems 310-1; . . . ; 310-N, and their associated operators 312-1; . . . ; 312-N and tagged invocation data (or statistics) 325-1; . . . ; 325-N.

In summary, each computer system 310 is arranged to execute or process a provisioned executable (such as a binary executable) version 342 of the item of software 340 under control of a respective operator (or user) 312 of the computer system 310. During execution of the provisioned executable 342 the current execution state of the running provisioned executable 342 is logged by the computer system 310. Typically it is the user 312 that inputs an indication of the current execution state to the computer system 310. The provisioned executable 342 also causes invocation data (such as invocation statistics) relating to callable units of the provisioned executable 342 to be logged—the nature of the invocation data shall be described in more detail later on. The invocation data are labelled (or tagged) according to the corresponding logged execution states. The resulting labelled (or tagged) invocation data 325 are communicated (or transmitted) to the training module 320. The training module is arranged to train (or otherwise configure) the identification algorithm 330 according to the received labelled invocation data such that the trained identification algorithm identifies a current execution state for the item of software 340 (or an executable thereof) based on corresponding invocation data. In this way the identification algorithm may be thought of as a classification algorithm trained to classify invocation statistics of a particular item of software 240 (or an executable thereof) according to the execution state of the item of software when the invocation data were logged (or generated or collected).

The training system 300 and the computer system 310 may be arranged to communicate with each other over, or via, the network 370. The network 370 may be any kind of network suitable for transmitting or communicating data between the training system 300 and the computer system 310. For example, the network 370 could comprise one or more of: a local area network, a wide area network, a metropolitan area network, the internet, a wireless communications network, a cable network, a digital broadcast network, a satellite communication network, a telephone network, etc. The training system 300 and the computer system 310 may communicate over the network 370 via any suitable communication mechanism/protocol in order to communicate data with each other. However, it will be appreciated that other communication scenarios are possible.

The computer system 310 and the training system 300 may each be, or may each comprise, one or more computer systems 100 as described above with reference to FIG. 1. For example, the computer system 300 may be a personal computer, a server computer, a laptop, a mobile telephone, a tablet computer, a television, etc. Similarly, the training system 300 may, for example, comprise one or more server computers.

The provisioning module 315 is arranged to receive the item of software 340. The item of software 340 may be received in the form of an executable (such as a binary executable) 345 of the item of software. Additionally, or alternatively the item of software 340 may be received in the form of one or more source code files for the item of software 340. Additionally, or alternatively the item of software 340 may be received in the form of one or more intermediate representations of the item of software (such as LLVM Intermediate Representation, Standard Portable Intermediate Representation (SPIR), PNaCL, etc.). The provisioning module 315 is arranged to generate the provisioned executable (such as a binary executable) 342 of the item of software. The provisioned executable 342 is generated such that, when executed (or when running or during runtime), the provisioned executable 342 enables invocation statistics relating to the provisioned executable 342 (and thereby the underlying item of software) to be collected. The provisioning module 315 may be arranged to modify the item of software 340 at a source code level. Additionally, or alternatively the provisioning module 315 may be arranged to modify the item of software 340 at an intermediate representation level. Most typically the provisioning module is arranged to modify the executable 345 of the item of software to generate the provisioned executable 342. For example, the provisioning module 315 may insert new code to the existing executable to record invocation statistics. This may include inserting code to: increment a counter value with each execution of a callable unit, storing the counter value in a storage location and associating an identifier of the callable unit with that storage location. It will be appreciated that such modification (typically referred to as provisioning) may be carried out in a number of ways such as any of: binary (or program) rewriting; dynamic binary instrumentation; hooking callable unit calls (such as is done in debugging procedures); DLL injection; etc.

For example, a jump instruction may be inserted into the item of software at the start of the callable unit. The jump instruction may cause the execution path (or flow) to jump to a piece of code (or set of program instructions) in a helper application (which may be part of the modified item of software) which is arranged to increment a counter for the particular callable unit. The piece of code may then end with a jump instruction which causes the execution flow to jump back to the callable unit.

The invocation data to be collected comprises data collected or generated upon the invocation (or calling) of one or more callable units of the item of software 340. The invocation data typically corresponds (or relates) to the calling (or execution) of the callable unit. In particular, the invocation data may comprise (or may be) invocation statistics which characterize the calling (or execution) of the callable unit. As discussed above an item of software 340 may comprise a number of callable units. During execution (or runtime) of the item of software 340 a callable unit may be invoked (or called or run) a number of times. The number of times that a callable unit is invoked typically depends on the execution path through the item of software 340. The invocation statistics may comprise data (or information or measurements) at least partially characterizing the invocation of a callable unit during runtime (or execution). Typically the invocation data are recorded (or collected) as a time series (or according to one or more time intervals or periods).

An example of invocation statistics comprises respective call (or invocation) counts for a plurality of callable units of the item of software. The respective call count for a callable unit indicates the number of invocations of said callable unit in a given time interval in the runtime of the item of software. In order to collect call counts the provisioned executable may be arranged to maintain respective call counts for each callable unit for which the invocation statistics are to be collected. Said call counts may be incremented each time the corresponding callable unit is invoked. The invocation statistics may them comprise a plurality of snapshots of said call counters taken at predefined time intervals during execution of the provisioned executable 342. A call count for a given callable unit for the period of time between two snapshots may then be obtained as the difference in the call counter for that callable unit between the two snapshots. It will be appreciated that other ways of collecting such invocation data would be apparent to the person skilled in the art and the systems and methods described herein can use any suitable method for collecting invocation data.

Equally the invocation statistics are not limited to call counts and other statistics (or data or measurements) regarding invocation of callable units may be collected as invocation statistics as well as, or instead of call count. For example the invocation statistics may comprise any one or more of: the identity of the callable unit invoking a given callable unit (e.g. the call stack at the time of invocation); the execution time of the invoked callable unit (e.g. as wall or real time and/or as CPU time); the time of invocation of the callable unit; time of invocation of a callable unit relative to the time of invocation of another callable unit; etc. Additionally, or alternatively the invocation statistics may comprise information (or measurements) relating to (or at least partially characterizing) the arguments to a callable unit when it is invoked. In particular, the invocation statistics may comprise: the number of arguments supplied to a callable unit on invocation; the value of one or more arguments supplied to a callable unit on invocation; the argument type of one or more units supplied to a callable unit on invocation; etc.

In this way the invocation statistics may be thoughts of as a plurality of measurements over time of the invocation of one or more callable units.

The computer system 310 is arranged to execute the provisioned executable 342 under the control of an operator 312 as described above. During execution of the provisioned executable 342 the execution state of the item of software 340 recorded (or logged) at the computer system 310. Typically the operator 312 of the computer system 310 manually indicates the execution state during execution. It will be appreciated that the operator 312 may be assumed to be aware of the execution state of the execution state of the item of software 340 based on the operator's 312 use of the item of software 340 at the time. The operator 312 may be prompted by the computer system 310 to indicate the execution state one or more times during execution of the provisioned executable 342. Additionally, or alternatively the operator may be able to indicate the change in execution state to the computer system 310 without prompting. For example, the operator 312 may provide a pre-determined key command to indicate that a given execution state has now been entered. The functionality to enable the recording (or logging) may typically be enabled by the provisioned executable itself. However, it will be appreciated that such functionality may be enabled by one or more other applications (or programs), which may be provided to the computer system 310 with the provisioned executable.

It will be appreciated that the execution state of the item of software may be determined and logged automatically. Such automatic determination of execution state may be carried out by one or more helper programs included as part of or provided with the provisioned binary. Typically the automatic determination of execution state involves intrusive monitoring techniques being carried out on the computer system 310. Examples of such automatic determination of execution state may include any of:

- monitoring network traffic at the computer system 310 to identify execution state based on known patterns of network traffic in particular states. For example, an online execution state may be determined by the presence of network traffic above a predetermined threshold and/or network traffic directed at a particular destination (or server). Similarly an offline execution state may be determined by the absence of such network traffic.
- input injection, where input commands are triggered automatically at the computer system 310 by the provisioned executable and/or a helper application and the response detected by the provisioned executable and/or a helper application. For example, in a particular execution state (such as a demo state) a certain key press may trigger a known display element to be displayed. By triggering the keypress (such as via an API call to the operating system) the helper application may observe whether the expected element is displayed and therefore whether the item of software is in the particular execution state.
- remote monitoring. For example where the item of software operates in conjunction with a remote server it may be possible to determine the execution state based on the processing occurring at the remote server. As such the remote server may be configured to analyses the processing and identify the execution state.

The computer system 310 is arranged to provide a labelled (or tagged) version of the collected invocation data 325 (referred to herein as labelled invocation data) to the training system 300. Such labelled invocation data 325 may be thought of as indicating the execution state recorded for the item of software 340 at the point in runtime that the particular invocation data were collected. For example, where the invocation data comprise a plurality of snapshots of data (or statistics, such as call counters) each snapshot may be labelled with the execution state recorded for the time at which the snapshot was taken (or to which the snapshot relates). Where the invocation data may be thought of as a time series of data (or measurements or statistics) the labelled invocation data may comprise the corresponding time series of recorded execution states. As such it will be appreciated that the labelled invocation data provide an indication of the recorded execution state corresponding to measurements of invocation of one or more callable units.

Possible execution states of the item of software 340 are typically pre-defined. The possible execution states may correspond to different functionality available in the item of software 340. It will be appreciated however that the execution states available to be selected will usually be defined for the item of software, and thus the same of each operator 312. Typically the execution states will be defined based at least in part on security requirements (or considerations). Additionally, or alternatively the execution states may be defined at least in part on performance requirements and/or functional requirements. For example, an item of software 340 which provides content playback may define an execution state for low-definition content playback and an execution state for high-definition content playback. This may reflect the greater requirement for content protection when playing back high-definition content. Similarly, an item of software 340 which provides content playback may define an execution state for encrypted content playback, and an execution state for unencrypted content playback. This may reflect the greater requirement for securing encryption keys in memory when playing back encrypted content. In another example, an item of software 340 which provides a computer game may define an execution state for online (and/or multiplayer) play and an execution state for offline (and/or single player) play. This may reflect a greater requirement for preventing unauthorized functionality during online (and/or multi-player) play. Conversely this also may reflect a requirement to improve (or maintain) overall performance during offline (and/or single player play) at the expense of not preventing unauthorized functionality. Other examples of such requirements may include any of: a requirement to identify when an item of software is displaying paid for or premium content, so as to enable protections to prevent capture of the content; a requirement to identify when the item of software is being run under a debugging platform; etc. It will be appreciated that the skilled person would be able to determine suitable executions states for a given item of software 342 based at least upon security and/or performance requirements of various elements of functionality provided by the item of software 340.

The training module 320 is arranged to receive labelled invocation data 325 from one or more computer systems 310. The labelled invocation data 325 may be in the form of one or more sets (or items) of labelled invocation data 325 corresponding to different computer systems 310, and/or different runs (or executions) of the item of software 340 on one or more computer systems 310. In this way the labelled invocation data 325 received by the training module 320 may represent (or correspond to) multiple execution paths through the same item of software 340. Similarly, the labelled invocation data 325 received by the training module 320 may represent (or correspond to) the labelling of execution states by multiple different operators 312 (typically according to the same set of possible execution states) for the same item of software 340.

The training module 320 is arranged to generate a trained state identification algorithm 330 based on the received labelled invocation data 325. The training module 320 may be arranged to generate the trained state identification module by applying a machine learning training process. It will be appreciated that the labelled invocation data 325 may be thought of as labelled training data to which standard machine learning techniques, such as supervised machine learning algorithms, may be applied. As such the trained state identification algorithm may be or comprise a trained classifier, configured by a training process, to classify unlabelled invocation data from the execution of the item of software according to execution state of the item of software. It will be appreciated that any suitable supervised machine learning algorithm may be used to generate the trained state identification algorithm 330. Examples include: support vector machines; decision trees; neural networks; etc. Similarly, genetic algorithms or other heuristic optimization methods (such as simulated annealing) may also be used to generate the trained state identification algorithm.

For example, a random forest machine learning system (or algorithm) may be used to train a random forest classifier. In this way it will be understood that the training of the identification algorithm may comprise providing the labelled invocation data to the random forest machine learning system. The random forest machine learning system may then generate a classifier (in the form of a number of decision trees) which would be capable of labelling future, unlabelled, invocation data with the appropriate execution state, In this way it will be understood that the identification algorithm may be partly or wholly generated (or constructed) by training process.

The training module 320 may also be arranged to identify a sub-set of callable units from the callable units represented in the received invocation data 325. The training module 320 may be arranged to calculate, for a given callable unit, a measure of correlation between a change in the invocation data for the callable unit and a change in the corresponding execution state. In particular, the training module 320 may include a callable unit in the sub-set based at least in part on the correlation calculated for the callable unit. In this way the callable units in the sub-set may be selected to be those callable units for which the corresponding invocation data have a strong correlation with changes in execution state. In other words the callable units most predictive of execution state may be selected by the training module 320. The training module may be arranged to filter the received labelled invocation data 325 to remove the invocation data relating to callable units not present in the sub-set. In this way the training module 320 may be arranged to generate the trained state identification algorithm 330 based on the filtered received labelled invocation data 325. Thus the trained state identification algorithm may be enabled to identify an execution state based on invocation data relating solely to the sub-set of callable functions. It will be appreciated that the identification of a sub-set of callable units may be carried out prior to any machine learning training discussed above. Additionally, or alternatively the identification of the sub-set of callable units may be done as part of the machine learning training.

It will be appreciated that the provision module 315 may also be arranged to generate a further provisioned executable. The further provisioned executable may be generated in the same manner as the provisioned executable described above. However, the further provisioned executable is arranged to enable logging of invocation data only in relation to the sub-set of callable units identified above. In this way the overhead of collecting invocation data imposed by such provisioning may be reduced and only the data required for the trained state identification algorithm are required to be collected.

In the discussion above the provisioning module 315 is presented as part of the training system, 300 and the computer systems 310 receive the provisioned executable 342 from the training system 300. However, it will be appreciated that the provisioning module 315 may be located separately to the training system 300 and may be operated by a separate entity to the training system 300. It will further be appreciated that the provisioned executable 342 may be provided to the computer systems 310 indirectly, or offline. For example the provisioned executable may be loaded onto the computer systems 310 from physical media etc.

Turning to FIG. 3b, the identification system 350 comprises (or is arranged to carry out) a trained identification algorithm 330 as described above in relation to FIG. 3a. FIG. 3b also shows a network 370 (which may be the same or different to the network 370 discussed above), a computer system 210 (as described above in relation to FIGS. 2a and 2b) and a protection system 380.

In summary, the computer system 210 is arranged to execute or process an end-user provisioned executable version of the item of software 340 under control of an operator (or user) 212 of the computer system 210. The end-user provisioned executable 346 may be the provisioned binary executable 342 or the further provisioned binary executable described above in relation to FIG. 3a. During execution of the end-user provisioned executable 346 invocation data 322 (as described above in relation to FIG. 3a) are provided to the identification system 350. Typically the invocation data 322 are provided as they are collected at the computer system 210. The invocation data 322 are typically collected at the computer system 210 on a periodic basis according to a pre-determined time period. The identification system 350 is arranged to apply the trained state identification algorithm 330 to the received invocation data 322 so as to determine a current execution state 332 for the item of software running 340 running on the computer system 210. The identification system 350 may be arranged to provide the current execution state 332 to the protection system 380. The protection system 380 may be arranged to, based on the received current identification state 332, enable and/or disable one or more software protection mechanisms present in the item of software 340 running on the computer system 210. Typically the software protection mechanisms are enabled/disabled according to pre-defined criteria regarding the execution state. For example, the execution state 332 may indicate that the item of software 340 is in a demonstration mode, and a protection system 380 may then be arranged to disable one or more software protection mechanisms. Conversely, the execution state 332 may indicate that the item of software 340 is in a production mode, and the protection system 380 may then be arranged to enable one or more (or all) of the software protection mechanisms.

The identification system 350, the computer system 210 and where present the protection system 380 may be arranged to communicate with each other over, or via, the network 370. The network 370 may be any kind of network suitable for transmitting or communicating data between the identification system 350, the computer system 210 and where present the protection system 380. For example, the network 370 could comprise one or more of: a local area network, a wide area network, a metropolitan area network, the internet, a wireless communications network, a cable network, a digital broadcast network, a satellite communication network, a telephone network, etc. The identification system 350, the computer system 210 and where present the protection system 380 may communicate over the network 370 via any suitable communication mechanism/protocol in order to communicate data with each other. However, it will be appreciated that other communication scenarios are possible.

The computer system 210 may be arranged to secure the invocation data 322 on collection for confidentiality and/or authenticity. In particular the invocation data 322 may be encrypted and/or digitally signed. Such functionality may be provided (or enabled) by the end-user provisioned binary 346. In this way the authenticity of the invocation data may be ensured.

The protection system 380 may comprise (or additionally embody the functionality of) the verification system 230 as described above. The protection system 380 may be communicatively coupled to the verification system 230. In these ways it will be appreciated that the protection system 380 may be arranged to instruct or otherwise cause the verification system to apply or disapply one or more software protection mechanisms present in the item of software based on the received current execution state 332.

As such it will be appreciated that the training system 300 and the identification system 350 may enable an existing item of software, which may be in the form of an existing binary executable, to be provisioned for distribution to an end user computer system such that the current execution state of the item of software on the end user system may be identified. This can be achieved without the need for modification of the item of software at a source code level. In this manner fine grained control of the use of software protection mechanisms previously applied to the item of software may be achieved based on execution state at run time. This can also be achieved by the above described systems without requiring the item of software to be inspected at a source code level. It will be appreciated that this is an important advantage as according to Rice's Theorem, in general, all non-trivial semantic properties of programs are undecidable. As such, for a non-trivial item of software identification of callable units associated with one or other executable state may be infeasible via code inspection. As such the above described systems allow such limitations to be overcome.

Figure 4A:
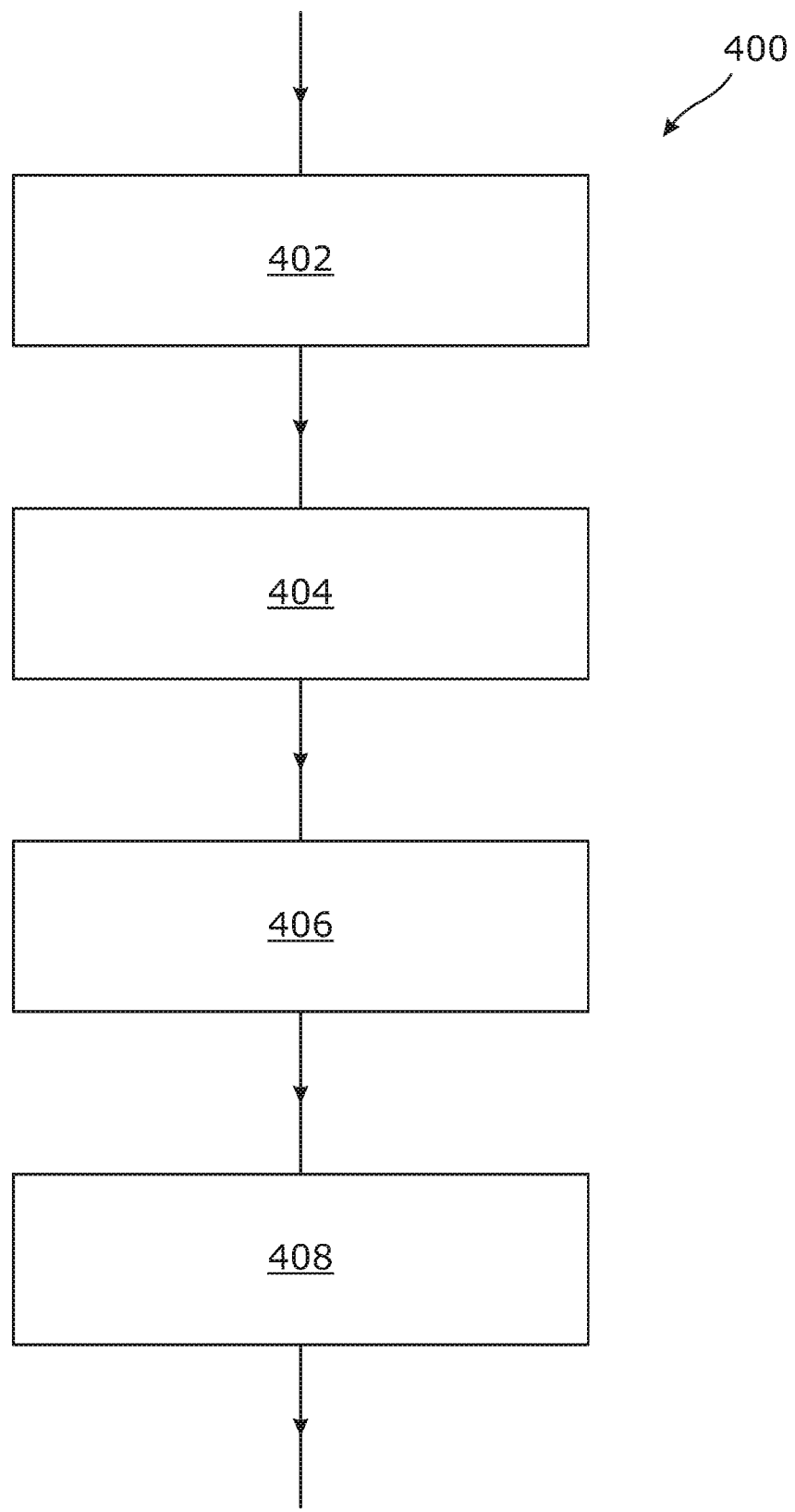
FIG. 4a is a flowchart illustrating an example method of operating a training system, such as the training system of FIG. 3a, according to some embodiments of the invention.

FIG. 4a is a flowchart illustrating an example method 400 of operating the training system 300 according to some embodiments of the invention.

At a step 402, the provisioning module 315 generates a provisioned binary executable 342 of the item of software 340 to enable said generated executable 342 to collect invocation data at runtime for a plurality of callable units of the item of software 340. This may comprise modifying an existing executable 345 of the item of software 340 to collect the invocation data. Alternatively, this may comprise generating the provisioned executable from source code and/or intermediate representations of the item of software 340.

At a step 404, the training system 300 may distribute the provisioned binary executable 342 to one or more computer systems (or clients) 312.

At a step 406, the training system 300 receives from each client one or more respective labelled sets of invocation data 325. As described above each labelled set of invocation data 325 may comprise a label indicating an execution state of the item of software 340 during a respective portion of runtime and invocation data corresponding to said respective portion of runtime. As mentioned the labelled invocation data 325 may be in the form of one or more sets (or items) of labelled invocation data 325 corresponding to different computer systems 310, and/or different runs (or executions) of the item of software 340 on one or more computer systems 310. In this way the labelled invocation data 325 received by the training module 320 may represent (or correspond to) multiple execution paths through the same item of software 340. Similarly, the labelled invocation data 325 received by the training module 320 may represent (or correspond to) the labelling of execution states by multiple different operators 312 (typically according to the same set of possible execution states) for the same item of software 340.

At a step 408, the training module 320 may train, based on said received invocation data, an identification algorithm 330 such that the trained identification algorithm 330 is arranged to identify the execution state of the item of software 340 based on (or from) collected invocation data 322 of the item of software 340. As mentioned the trained identification algorithm may be arranged (or trained) to identify the execution state based on (or from) collected invocation data 322 relating to the plurality of callable units. Alternatively, the training module 320 may identify a sub-set of the plurality of callable units for determining the execution state. As such, the identification algorithm 330 may be trained to identify the execution state of the item of software 340 from collected invocation data 322 of the sub-set of the plurality of callable units.

Figure 4B:
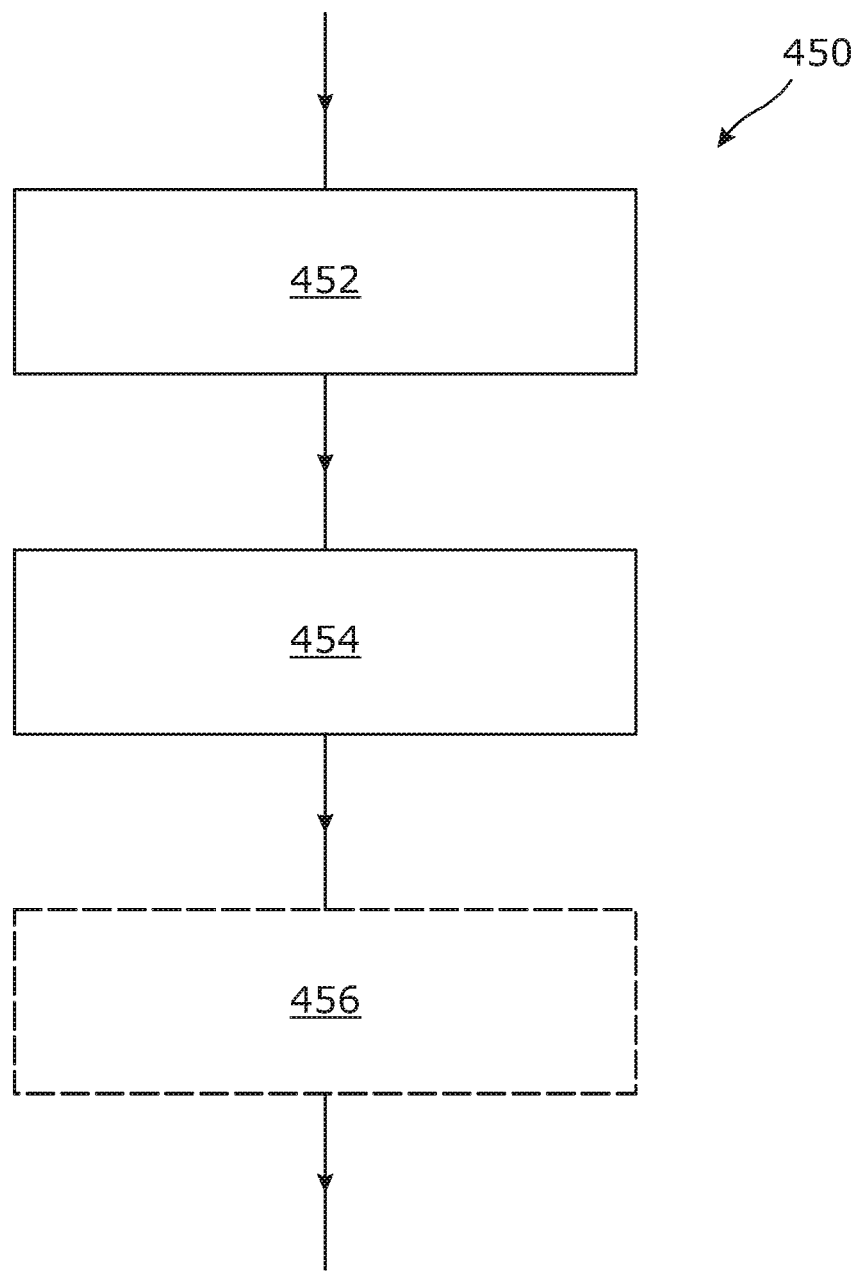
FIG. 4b is a flowchart illustrating an example method of operating an identification system, such as the identification system of FIG. 3b, according to some embodiments of the invention.

FIG. 4b is a flowchart illustrating an example method 450 of operating the identification system 350 according to some embodiments of the invention.

At a step 452, the identification system 350 receives from a computer system 210 invocation data 322 for a binary executable running (or executing) on the computer system 210. As mentioned the binary executable is a suitably provisioned binary executable of the item of software 340 discussed above. The invocation data 322 relate to a set of callable units of the binary executable (or item of software 340). As discussed above the set of callable units are the same set from which the identification algorithm 330 is trained to identify the execution state. In some embodiments this set of callable units may be a sub-set with respect to the plurality of callable units for which invocation data were collected in the step 406 of the method 400 above.

At a step 454, the identification system 350 identifies the current execution state 332 of the binary executable (and therefore the item of software 340) running on the computer system 210. This comprises applying the trained identification algorithm 330 to the received invocation data 322.

At an optional step 456, the protection system 380 may trigger a software protection mechanism in the executing binary executable in dependence on the identified current execution state. As mentioned this may comprise communicating with the computer system 210 to enable (or disable) a software protection mechanism. Additionally, or alternatively this may comprise communication with a verification system 230 to enable (or disable) a software protection mechanism. It will be appreciated that the determination of whether to trigger a particular software protection mechanism in dependence on a particular execution state may be dependent on one or more pre-determined rules available to the protection system.

Figure 5:
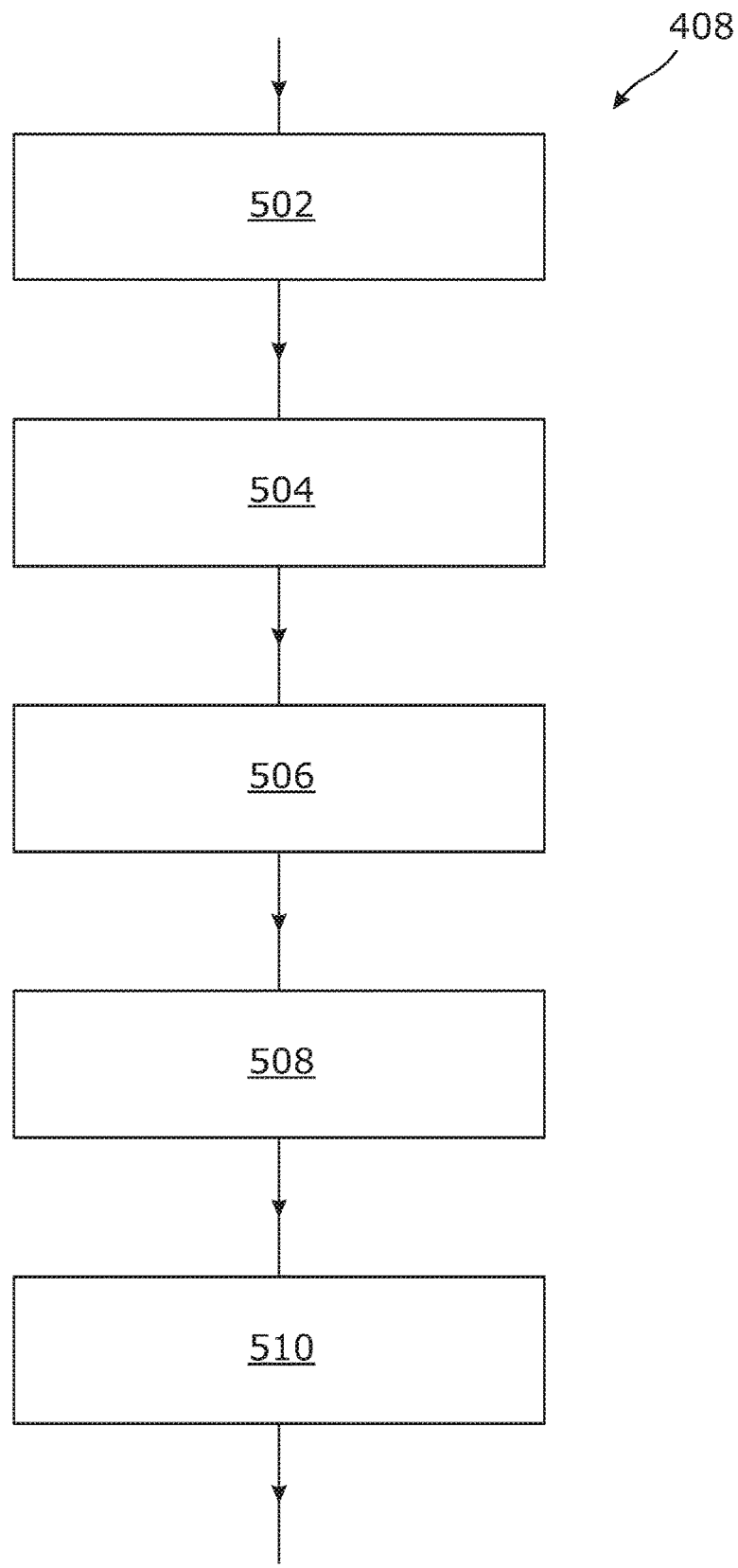
FIG. 5 is a flowchart illustrating an example implementation of a step of the method of FIG. 4a according to some embodiments of the invention.

FIG. 5 is a flowchart illustrating an example implementation of the step 408 of the method 400 according to some embodiments of the invention. In this example implementation the labelled invocation data 325 comprise a plurality of snapshots taken periodically during runtime. It will be appreciated that the skilled person may alter the periodicity to vary the performance effect of the profiling along with the accuracy of the state identification. Each snapshot comprises one or more respective invocation measurement values for each callable unit of the plurality of callable units. As mentioned previously a measurement may comprise any one of an invocation count for the callable unit; the identity of the callable unit invoking a given callable unit (e.g. the call stack at the time of invocation); the execution time of the invoked callable unit (e.g. as wall or real time and/or as CPU time); the time of invocation of the callable unit; time of invocation of a callable unit relative to the time of invocation of another callable unit; etc. Additionally, or alternatively the invocation data may comprise information (or measurements) relating to (or at least partially characterizing) the arguments to a callable unit when it is invoked. Each snapshot is labelled with an execution state as discussed previously.

At a step 502 a respective feature vector is calculated for each callable unit of the plurality of callable units. Each component of the feature vector corresponds to the measurement value for the callable unit for a respective snapshot. The measurement value may be binarized so that the feature vector is formed as a bit vector.

At a step 504 a labelling (or execution state) vector is calculated. Each component of the labelling vector corresponds to the execution state for a respective snapshot. The execution state value may be binarized so that the labelling vector is formed as a bit vector. It will be appreciated that the components feature vectors and the execution state vectors are ordered according to a common ordering of snapshots.

At a step 506, for each callable unit, a distance (such as a distance vector) is calculated between the respective feature vector and the labelling vector. The distance may be calculated as a normalized distance. Here it will be appreciated that maximal or minimal distances indicate a high correlation between the feature vector of the callable unit and the labelling vector. In this way maximal or minimal distances indicate that the respective measurements of the respective callable unit are strongly correlated with the execution states represented in the labelling vector.

At a step 508, a sub-set of callable units is identified based at least in part on the respective distance vectors. In particular, the sub-set may include the callable units who have distance vectors within a threshold value of the maximal or minimal distance. Additionally, callable units may be excluded from the sub-set based on further criteria applied to the measurement values for said callable units. The further criteria may be defined based on performance requirements for the item of software. For example, callable units with an invocation counter that exceeds a pre-determined threshold may be excluded. It will be appreciated that this allow, for example, callable units that are invoked frequently during execution to be excluded from the overhead of maintain invocation counters. It will also be appreciated that such thresholds may be applied by corresponding weighting scores. Similarly, thresholds and/or other criteria may be applied to the entire sub-set. For example, a limit on the sum of the invocation counts for all callable units in the sub-set may be enforced, and the callable units selected accordingly. Additionally, or alternatively a limit on the number of callable units in the sub-set may be enforced.

At a step 510, the identification algorithm is trained (or generated) to identify the execution state of the item of software based on invocation data for the sub-set of callable units. This may comprise applying a machine learning technique such as described above to the labelled invocation data for just the sub-set of callable units. It will be appreciated that in some examples the steps 508 and 510 may be carried out as part of the same process and may not be separate steps.

In cases where there are more than two execution states it will be appreciated that the above steps may be applied in an iterative fashion. The labelling vector may be binarized as a value indicating "in a given execution state" and "not in the given execution state". In this way the trained identification algorithm may proceed in a hierarchical fashion first identifying if the execution state is the first state, if not then identifying if the state is a second state and so on and so forth.

By way of a further worked example the below algorithm is presented as a possible more specific implementation of the above method. In this example the invocation data comprise invocation counters for each callable unit as a set of periodic snapshots. Each snap shot is labelled according to one of two execution states (a first execution state and a second execution state).

For each snapshot the invocation counter value are binarized such that they are set to 1 if that counter has increased since the previous snapshot, and set to 0 if that counter value has remained the same. In this way if a given callable unit has been invoked between the previous snapshot and the current snapshot it has a counter value 1. If a given callable unit has not been invoked between the previous snapshot and the current snapshot it has a counter value 0. A feature vector can then be generated for each callable unit using the binarized counter values, in line with the step 502. By way of illustration for a callable unit which was called in the first two snapshots but not in the following three, the feature vector v may look like:

$$v = \begin{pmatrix} 1 \\ 1 \\ 0 \\ 0 \\ 0 \\ \vdots \end{pmatrix}$$

In line with the step 504 a labelling vector may be generated by assigning a binary 1 to the first execution state and a binary 0 to the second execution state. By way of illustration the labelling vector l for execution which was in the second execution state for the first three snapshots and the first execution state for the second two snapshots may look like:

$$l = \begin{pmatrix} 0 \\ 0 \\ 0 \\ 1 \\ 1 \\ \vdots \end{pmatrix}$$

In line with the step 506 a distance between the respective feature vector and the labelling vector may be calculated for each callable unit. This may be calculated as a normalized Hamming distance between the respective binary feature vector and the binary labelling vector. As will be understood a normalized Hamming distance of 0 or 1 should show a perfect correlation between the invocation of the callable unit and one of the execution states and the non-invocation of the callable unit and the other one of the execution states.

In line with the step 508 the sub-set of callable units may be identified as follows:

A queue of callable units is created. Each callable unit is listed twice, once scored by the calculated distance, once by the opposite value (i.e. 1—distance for a normalized distance). The queue is sorted according to these values.

An empty sub-set of selected callable units is created.

While number of callable units in the sub-set is less than a threshold value (for example if at most 512 callable units were wanted in the sub-set this threshold would be 512):

Select the next callable unit from queue;

If function distance outside a threshold value of the maximum or minimum distance (such as >10% of the minimum distance and less than 90% of the maximum distance, discard the callable unit from the queue and terminate the loop);

If the callable unit's counter value exceeds a pre-determined threshold in any snapshot discard the callable unit from the queue and iterate the loop (as set out previously this threshold may be chosen so as to avoid including often invoked callable units in the profiling to avoid excessive performance degradation when executing the profiled binary);

Calculate the mean (per snapshot) counter values for all callable units in the sub-set and the currently selected callable unit:

If the calculated mean exceeds a predetermined threshold and number of callable units in the sub-set is greater than a pre-determined number, then discard the callable unit from the queue and iterate the loop;

If the calculated mean exceeds a predetermined threshold and number of callable units in the sub-set is less than a pre-determined number, then add callable unit to the sub-set, but also remove callable unit from the sub-set the callable unit with the highest mean counter value;

In all other cases, add the callable unit to the sub-set.

In this way the sub-set of callable units may be constructed whilst controlling the size of the sub-set and optimizing the sub-set according to accuracy of the subsequent identification of execution state and performance implications of the subsequent profiling in the profiled binary via the predefined parameters discussed above. Here it will be appreciated that each callable unit of the sub-set is associated with the second execution state (represented by a binary 0) if the Hamming distance for the callable unit is within the threshold of the minimum value, or associated the first execution state (represented by a binary 1) if the Hamming distance for the callable unit is within the threshold of the maximum value.

In this example the identification algorithm itself may for a given snapshot sum the binarized counter values for the callable units in the sub-set associated with the first execution state, and sum the binarized counter values for the callable units in the sub-set associated with the second execution state. The execution state identified would be the state with the larger sum value.

Figure 6:
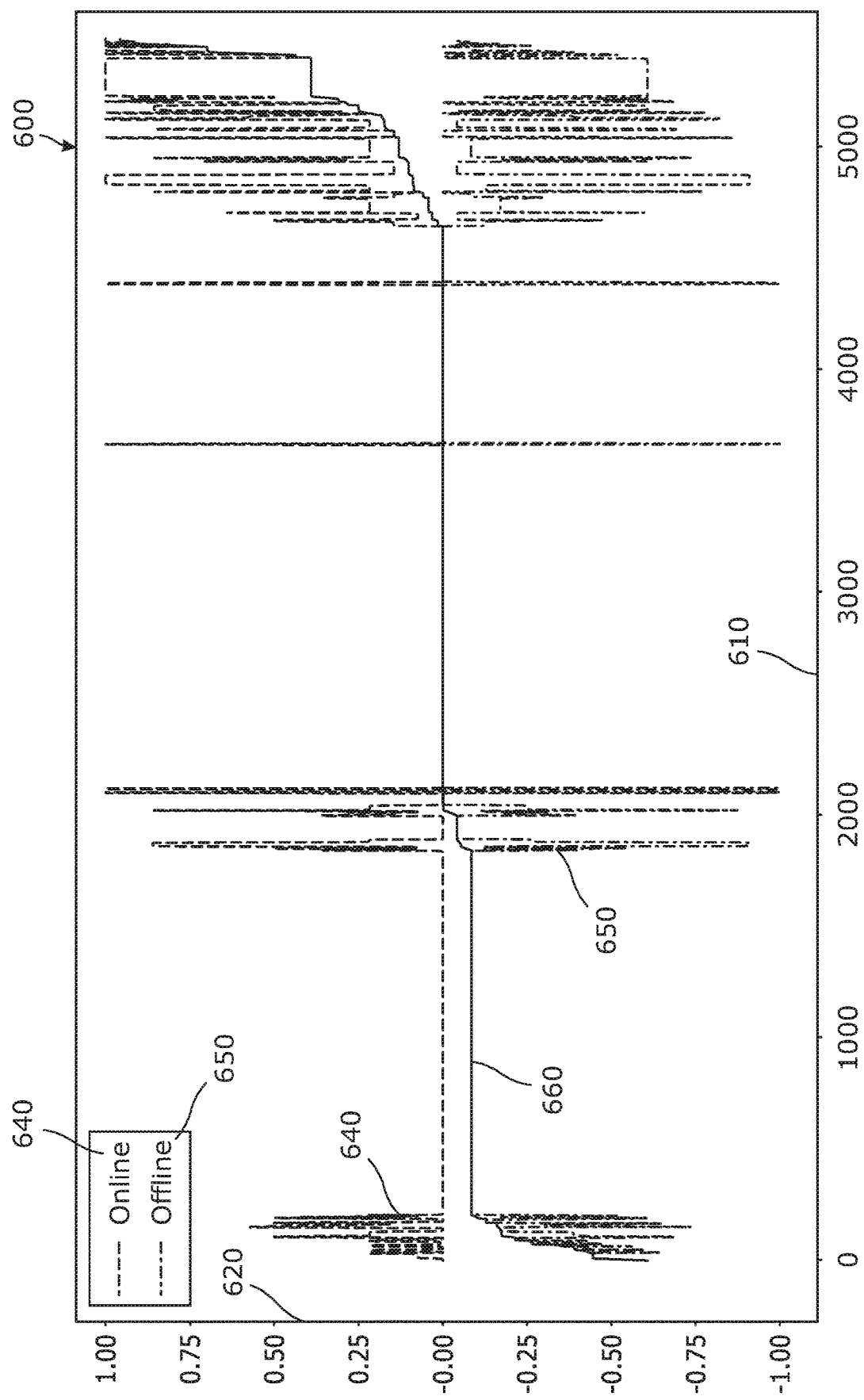
FIG. 6 shows a graph of invocation statistics for an example item of software.

FIG. 6 shows a graph 600 of invocation statistics for an example item of software 340. The item of software here is "Sauerbraten", a free single- and multi-player first-person shooter game (available at http://sauerbraten.org/). The item of software was provided in the form of a 64-bit x86 binary executable. The binary executable has been modified to record invocation counts for 55000 callable units (in this case functions) present in the binary executable. The functions are labelled consecutively with integers 1 to 55000. For ease of processing, counters are binarized (set to 1 if a function has been called at least once) for each snapshot. Snapshots have been taken every 10 seconds, sampling approximately 3 minutes of an offline execution state and 3 minutes of an online execution state.

The horizontal axis 610 lists the function label and the vertical axis 620 the invocation counter.

For each function, the average invocation count for all snapshots is computed relating to online (shown with the dashed line 640) and offline play (shown with the dashed and dotted line 650). The offline average has been scaled by −1 to be more clearly shown in the graph. It can be seen that certain functions are called constantly (i.e. with values close to +/−1.0), whilst other functions are called rarely.

The solid line 660 indicates the difference between the average invocation count for online and offline play (i.e. a differential call count).

It can be seen that the first few functions (about 50) are indicative of offline play (i.e. the offline execution state). Conversely, the last few functions (around 20) are indicative of online play (i.e. the online execution state). Further, certain functions have never been called (e.g., around function 1000), while other functions are called equally for online- and offline play (e.g. functions 2000 to around 4800).

In this way it can be seen how an identification function may be trained using machine learning methods and the other methods set out above to identify the two execution states based on invocation statistics such as those shown here.

Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of enabling identification of the execution state of an item of software at runtime, the method comprising:
    receiving from one or more clients one or more respective labelled sets of invocation data generated at the one or more clients by the execution of an executable of the item of software configured to cause the collection of invocation data at runtime for one or more callable units of the item of software, wherein each labelled set of invocation data comprises a label indicating an execution state of the item of software during a respective portion of runtime and invocation data corresponding to said respective portion of runtime; and
    training, based on said collection of invocation data, an identification algorithm to identify the execution state of the item of software from collected invocation data of the item of software;
    wherein said executable is enabled to collect invocation data at runtime for a plurality of callable units and said step of training comprises identifying a sub-set of the plurality of callable units for determining the execution state, and the identification algorithm is trained to identify the execution state of the item of software from collected invocation data of the sub-set of the plurality of callable units.

2. The method of claim 1 further comprising:
    generating the executable of the item of software to enable said generated executable to collect invocation data at runtime for one or more callable units of the item of software;
    distributing the generated executable to the one or more clients.

3. The method according to claim 2 wherein the step of generating executable comprises modifying an existing executable of the item of software to collect the invocation data.

4. The method of claim 1 further comprising generating a further executable, wherein said further executable is arranged to collect invocation data at runtime for the sub-set of the plurality of callable units.

5. The method of claim 4 wherein the step of generating a further executable comprising modifying an existing executable to collect invocation data at runtime for the sub-set of the plurality of callable units.

6. The method of claim 1 wherein a callable unit is included in the sub-set based at least in part on a measure of correlation between a feature vector based on the invocation data for the callable unit and an execution state vector based on the execution state labels associated with the invocation data for the callable unit.

7. The method of claim 1 wherein a callable unit is included in the sub-set based at least in part on the frequency of invocation of the callable unit.

8. The method of claim 1 wherein the step of training comprises applying a supervised machine learning algorithm to the labeled invocation data.

9. A method of identifying the execution state of an executable of an item of software during a portion of runtime, the method comprising:
    receiving, during runtime of the executable, invocation data for a set of callable units of the executable; and
    applying a trained identification algorithm to the received invocation data to identify the current execution state of said executable, the trained identification algorithm trained based on one or more respective labelled sets of training invocation data received from one or more clients, the one or more respective labelled sets of training invocation data generated at the one or more clients by execution of the executable, each labelled set of training invocation data comprising a label indicating an execution state of the item of software during a respective portion of runtime and training invocation data corresponding to said respective portion of runtime, the training invocation data being training invocation data of a sub-set of callable units of the executable, the sub-set of callable units identified for determining the execution state.

10. The method of claim 9 further comprising triggering a software protection mechanism in the instance of the executable in dependence on the identified current execution state and/or further comprising disabling a software protection mechanism in the instance of the executable in dependence on the identified current execution state.

11. The method of claim 1 wherein the invocation data comprises one or more of:
    a respective invocation count for each callable unit;
    a respective call stack for the invocation of each callable unit;
    a respective execution time of each callable unit;
    a respective time of invocation for each callable unit.

12. A system comprising one or more processors and a memory coupled to the one or more processors which are configured to execute programmed instructions stored in the memory to carry out a method of enabling identification of the execution state of an item of software at runtime, the method comprising:
    receiving from one or more clients one or more respective labelled sets of invocation data generated at the one or more clients by the execution of an executable of the item of software configured to cause the collection of invocation data at runtime for one or more callable units of the item of software, wherein each labelled set of invocation data comprises a label indicating an execution state of the item of software during a respective portion of runtime and invocation data corresponding to said respective portion of runtime; and training, based on said collection of invocation data, an identification algorithm to identify the execution state of the item of software from collected invocation data of the item of software;

wherein said executable is enabled to collect invocation data at runtime for a plurality of callable units and said step of training comprises identifying a sub-set of the plurality of callable units for determining the execution state, and the identification algorithm is trained to identify the execution state of the item of software from collected invocation data of the sub-set of the plurality of callable units.

13. A non-transitory computer readable medium storing a computer program which, when executed by one or more processors, causes the one or more processors to perform a method of enabling identification of the execution state of an item of software at runtime, the method comprising:

receiving from one or more clients one or more respective labelled sets of invocation data generated at the one or more clients by the execution of an executable of the item of software configured to cause the collection of invocation data at runtime for one or more callable units of the item of software, wherein each labelled set of invocation data comprises a label indicating an execution state of the item of software during a respective portion of runtime and invocation data corresponding to said respective portion of runtime; and training, based on said collection of invocation data, an identification algorithm to identify the execution state of the item of software from collected invocation data of the item of software;

wherein said executable is enabled to collect invocation data at runtime for a plurality of callable units and said step of training comprises identifying a sub-set of the plurality of callable units for determining the execution state, and the identification algorithm is trained to identify the execution state of the item of software from collected invocation data of the sub-set of the plurality of callable units.

14. A non-transitory computer readable medium storing a computer program which, when executed by one or more processors, causes the one or more processors to perform a method of identifying the execution state of an executable of an item of software during a portion of runtime, the method comprising:

receiving, during runtime of the executable, invocation data for a set of callable units of the executable; and applying a trained identification algorithm to the received invocation data to identify the current execution state of said executable, the trained identification algorithm trained based on one or more respective labelled sets of training invocation data received from one or more clients, the one or more respective labelled sets of training invocation data generated at the one or more clients by execution of the executable, each labelled set of training invocation data comprising a label indicating an execution state of the item of software during a respective portion of runtime and training invocation data corresponding to said respective portion of runtime, the training invocation data being training invocation data of a sub-set of callable units of the executable, the sub-set of callable units identified for determining the execution state.

15. The method of claim 9 wherein the invocation data comprises one or more of:

a respective invocation count for each callable unit;

a respective call stack for the invocation of each callable unit;

a respective execution time of each callable unit;

a respective time of invocation for each callable unit.

16. A system comprising one or more processors and a memory coupled to the one or more processors which are configured to execute programmed instructions stored in the memory to carry out a method of identifying the execution state of an executable of an item of software during a portion of runtime, the method comprising:

receiving, during runtime of the executable, invocation data for a set of callable units of the executable; and applying a trained identification algorithm to the received invocation data to identify the current execution state of said executable, the trained identification algorithm trained based on one or more respective labelled sets of training invocation data received from one or more clients, the one or more respective labelled sets of training invocation data generated at the one or more clients by execution of the executable, each labelled set of training invocation data comprising a label indicating an execution state of the item of software during a respective portion of runtime and training invocation data corresponding to said respective portion of runtime, the training invocation data being training invocation data of a sub-set of callable units of the executable, the sub-set of callable units identified for determining the execution state.

* * * * *